United States Patent Office 2,770,014
Patented Nov. 13, 1956

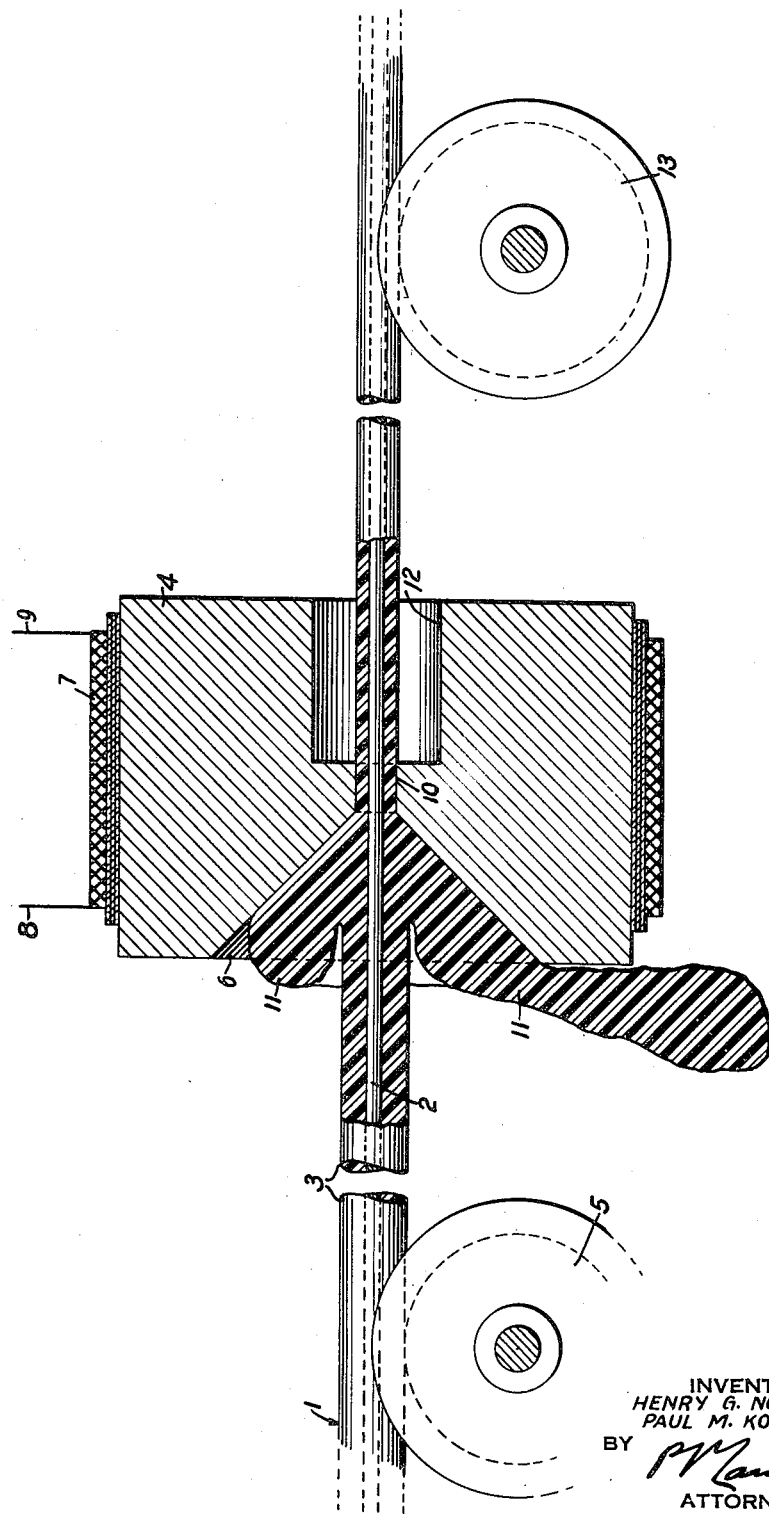

2,770,014

SIZING OF THERMOPLASTIC CABLE CORES

Henry G. Nordlin, Livingston, and Paul M. Koerner, Paterson, N. J., assignors to International Telephone and Telegraph Corporation, Nutley, N. J., a corporation of Maryland Application August 25, 1953, Serial No. 376,493

6 Claims. (Cl. 18—48)

This invention relates to the sizing of cable insulating material and is particularly concerned with a method and equipment for improving the uniformity and dimensional accuracy of extruded thermoplastic dielectric cores for radio-frequency cables.

In many applications of coaxial cables, including such special types as pulse cables and time-delay cables, variations in the core diameter of more than ±0.002 inch result in excessive variations in the electrical characteristics of the cable. Often such variations are sufficiently critical as to cause imperfect functioning of an equipment assembly of which the coaxial cable forms a part. Unfortunately, as well-known to those experienced in the design and manufacture of radio-frequency coaxial cables, tolerances in cable core diameter of less than ±0.005 inch cannot be maintained in the extrusion of dielectric cores for coaxial cables. Very often ±0.010 inch is the best tolerance that can be maintained during the usual continuous cable extrusion procedures. This is particularly true for the extrusion of polyethylene as a dielectric core because of the occurrence of irregularities in the dielectric during the extrusion process. The occurrence of these irregularities is believed to be due to the presence of clusters of partially molten aggregates in the polyethylene at temperatures in the vicinity of its melting point.

Various methods have been proposed heretofore for improving the dimensional accuracy of extruded cable cores. In one such proposed procedure the cable is passed between razor-blade-sharp cutters which shear small amounts from the cable core. In another procedure the cable is extruded slightly undersized and then re-extruded to desired size. In still another procedure, centerless grinding is resorted to. None of the foregoing procedures are considered satisfactory. Either desired dimensional tolerance cannot be maintained or conventional extrusion equipment and techniques cannot be employed.

It is an object of the present invention, therefore, to provide a method for improving the uniformity and dimentional accuracy of extruded thermoplastic material which is suitable for continuous operation. Another object is to provide a method particularly suitable for the accurate sizing of an extruded polyethylene cable core.

It is an additional object to provide simple equipment that may be used for the purpose of performing such methods.

It is a feature of this invention that a slightly oversized thermoplastic cable extrusion is guided precisely through the center of a heated, specially shaped die, the temperature of this die being maintained above the flow temperature of the thermoplastic. The temperature of the die and the rate of speed of the passage of the thermoplastic material through the die are closely controlled. The surplus plastic material is in effect "hot-ironed" from the core surface, thereby resulting in a smooth, dimensionally precise extrusion.

Further objects of this invention and features thereof will become apparent from the following drawing, in which the figure is an elevational view partly in section of the equipment used for accurately sizing the thermoplastic extrusion.

It should be noted that by use of the term "cable core" the practice is followed of those skilled in the cable art of defining this term to include, in a coaxial cable, that part of the cable lying beneath the outer conductor or braid. "Cable core" would then include the central conducting wire or, in certain cables, a center nonconductive carrier, and the dielectric insulation about this center conductor or carrier.

Referring to the drawing, a previously extruded cable 1 composed of a center carrier 2, which may or may not be an electric conductor, and a thermoplastic dielectric core 3 is passed through the metal die 4 of high thermal conductivity, preferably of brass. The cable is fed from a constant tension pay-off device such as a spring-loaded belt or drive shaft which serves at the same time to keep the cable both taut and moving over a precision guide roller 5. The entrance opening 6 of the die is conical in shape and preferably symmetrically disposed about its axis. A temperature controlled heater 7 in a band form completely surrounding the brass die, serves to heat this die. Leads 8 and 9 for electrical connection to the heater may be brought to a variable transformer for a closer control of the amount of heat supplied by the heater to the brass die.

The diameter of the cable core is oversized with respect to the diameter of the hole 10. As the cable passes through the die, the excess portions 11 of the oversized thermoplastic material are brought against the parallel sections of the hole 10 and are first melted and then sheared off, eventually being removed as waste. The symmetrical shape of the conical portion of the opening 6 insures an accumulation in annular form of a body of waste material which serves to maintain the cable in a centered position. The conical portion also serves to preheat the core prior to its passage through the hole 10, this preheating being performed through the medium of the heated body of waste material 11. The oversized hole 12 located on the exit side of the brass die serves as an annealing zone, preventing any abrupt transition in temperature from the heated die to the outside air. On emerging from the die, the cable core is led over another precision guide 13, which is essentially a single roller mounted on a shaft. Then the core is directed to a constant speed take-up device, such as a motor-driven constant-speed capstan.

Obviously, this invention is suitable for the sizing of thermoplastic materials intended for a wide variety of uses. Thus, plastic rod and plastic tubing of polyethylene and polystyrene used in the chemical processing industries, for example, may be dimensionally sized by this method. This method is suitable for use with any rubbery type or sharp-melting thermoplastic that is not decomposed by being brought into the molten state. However, the method is particularly intended for use where the end application requires the control of a core diameter within narrow limits. It is, therefore, particularly suitable for the accurate sizing of polyethylene cable core extrusions. In addition, problems presented in the sizing of polyethylene because of the abrupt transition between its solid and liquid phases are readily solved by this method.

By way of example, a previously extruded polyethylene core with a nominal diameter of 0.255±0.010 inch was fed in accordance wtih the principles of this invention into the die at a rate of 4 feet per minute. The die temperature was maintained at 300° C. The guide hole had a nominal diameter of 0.238±0.0005 inch. The cable after sizing had an outside diameter of 0.238±0.001 inch.

Using the conditions of the above example, we found that a polyethylene core may be sized with a smooth surface and no apparent decomposition; and with careful control of temperature and trimming rates, polyethylene cables with a dimensional stability of ±0.001 inch were readily obtained. We have found in sizing polyethylene that if the temperature is lowered below approximately 275° C., or if the trimming rate is in excess of 10 feet per minute, tearing of the surface and unevenness occur. When the temperature was increased above approximately 350° C. we observed a tendency for the core surface to decompose. In general, however, the increase in temperature is directly related to the trimming rate. Thus, increasing the die temperature requires the use of a more rapid trimming rate. Conversely, at lower temperatures slower trimming rates may be used.

This method may also be used for the sizing of a polystyrene dielectric by subjecting the outer polystyrene core surface to a preliminary preheating operation to render it soft and flexible. Basically this method is suitable for use with any thermoplastic material not decomposed at temperatures above its softening point and having a low thermal conductivity. Upon being brought in contact with a heated metal of relatively high thermal conductivity, sizing of the thermoplastic occurs, the outer portion of the thermoplastic material flowing readily whereas the central portion remains solid.

Obviously, the quality of the product obtained by this method is dependent to a great extent on the accuracy with which the guide hole is made. It may be drilled, bored, or machined. The foregoing method may, of course, be modified by placing several electrically heated dies in series to attain a still greater degree of dimensional control of the cable core size or for processing various types of thermoplastic materials. However, we have found that tolerances within ±0.001 inch may be readily obtained using a single electrically heated die. It is also obvious that minor changes in the shape of the die entrance portion 6 will not affect its operation. The use of brass for the die material is generally preferable because of its high thermal conductivity, which serves to minimize cooling in the area of contact with the plastic core, and also because of its good machinability properties. Electrical heating of the die has been preferred because of its ready controllability, but other methods of heating may also be used.

While we have described above the principles of our invention in connection with specific apparatus and method steps, it is to be clearly understood that this description is made only by way of example and not as a limitation to the scope of our invention as set forth in the objects thereof and in the accompanying claims.

We claim:

1. A process for the continuous sizing of a cylindrical form of thermoplastic material comprising passing said cylindrical form through a heated die whose sizing hole is maintained at a substantially uniform temperature along is axial length above the flow point of said thermoplastic material, the sizing hole of said die being of uniform bore and smaller normally than the diameter of said cylindrical form, and accumulating a body fluid of surplus thermoplastic material at the entrance to said die through which said cylindrical form must pass to thereby preheat and maintain the cylindrical form substantially centered within said die, and at least partially annealing said cylindrical form within said die at its output portion.

2. A process for the continuous sizing of a cylindrical form of polystyrene comprising preheating said polystyrene until the outer portion thereof is softened, passing said cylindrical form through a heated die whose sizing hole is maintained at a substantially uniform temperature along its axial length above the flow point of said polystyrene, the sizing hole of said die being of uniform bore and smaller normally than the diameter of said cylindrical form, and accumulating a body fluid of surplus polystyrene at the entrance to said die through which said cylindrical form must pass to thereby preheat and maintain the cylindrical form substantially centered within said die, and at least partially annealing said cylindrical form within said die at its output portion.

3. A process for the continuous sizing of a thermoplastic cable core comprising guiding said core through a uniform-bore sizing hole of a die, maintaining the sizing hole of said die at a substantially uniform temperature along its axial length above the flow point of the material constituting the outer portion of said core, the diameter of said hole being of a smaller size than the normal diameter of said core, and accumulating a body fluid of the surplus material removed from said core at the entrance to said die and in contact with said die and said core to preheat said core and maintain it substantially centered relative to the sizing hole of the die, and at least partially annealing said cable core within said die at its output portion.

4. In the manufacture of radio-frequency coaxial cables, a process for the continuous sizing of a polyethylene cable core for such cables comprising guiding said core through a uniform-bore sizing hole of a die, maintaining the sizing hole of said die at a temperature between 275 and 350 degrees centigrade, the diameter of said hole being of a smaller size than the normal diameter of said core, and maintaining an accumulation of the surplus material removed from the core at the entrance to the die through which said core must pass, and at least partially annealing said cable core within said die at its output portion.

5. A process according to claim 4 in which the rate of passage of said core through said uniform bore hole is maintained substantially at a rate between 3 feet and 10 feet per minute.

6. In the manufacture of radio-frequency coaxial cables, a process for the continuous sizing of a polyethylene cable core for such cables comprising guiding said core at approximately 4 feet per minute through a uniform bore hole of a die maintaining the sizing hole of said die at a temperature of approximately 300 degrees centigrade, the diameter of said hole being of a smaller size than the diameter of said core, and causing the surplus material removed from said core to coact with the inlet portion of said die to preheat and maintain the cable core substantially centered relative to the sizing opening of said die, and at least partially annealing said cable core within said die at its output portion.

References Cited in the file of this patent

UNITED STATES PATENTS

| | | |
|---|---|---|
| 1,189,674 | Engman | July 4, 1916 |
| 1,339,789 | Rothwell et al. | May 11, 1920 |
| 1,754,993 | Fenton | Apr. 15, 1930 |
| 1,862,947 | Smith et al. | June 14, 1932 |
| 2,052,005 | Root | Aug. 25, 1936 |
| 2,194,313 | Loomis | Mar. 19, 1940 |
| 2,245,608 | Rogers | June 17, 1941 |
| 2,286,759 | Patnode | June 16, 1942 |
| 2,348,591 | Bailey | May 9, 1944 |
| 2,535,286 | Henning | Dec. 26, 1950 |